(12) United States Patent
Slaby et al.

(10) Patent No.: US 9,245,165 B2
(45) Date of Patent: Jan. 26, 2016

(54) AUXILIARY FUNCTIONALITY CONTROL AND FINGERPRINT AUTHENTICATION BASED ON A SAME USER INPUT

(71) Applicant: MOTOROLA MOBILITY LLC, Libertyville, IL (US)

(72) Inventors: Jiri Slaby, Buffalo Grove, IL (US); Roger W. Ady, Chicago, IL (US); Rachid M. Alameh, Crystal Lake, IL (US); Chad Austin Phipps, Grayslake, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 11 days.

(21) Appl. No.: 13/832,042

(22) Filed: Mar. 15, 2013

(65) Prior Publication Data

US 2014/0270414 A1    Sep. 18, 2014

(51) Int. Cl.
*G06K 9/00* (2006.01)
*G06F 3/0354* (2013.01)
*G06F 21/32* (2013.01)
*G06F 21/36* (2013.01)
*G06F 3/0488* (2013.01)

(52) U.S. Cl.
CPC ........ *G06K 9/00013* (2013.01); *G06F 3/03547* (2013.01); *G06F 21/32* (2013.01); *G06F 21/36* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 6,459,804 B2 | 10/2002 | Mainguet | |
| 8,049,731 B2 | 11/2011 | Baker et al. | |
| 8,063,889 B2 | 11/2011 | Anderson | |
| 8,224,044 B2 | 7/2012 | Benkley, III | |
| 8,810,367 B2 | 8/2014 | Mullins | |
| 2002/0122026 A1 | 9/2002 | Bergstrom | |
| 2003/0038824 A1 | 2/2003 | Ryder | |
| 2004/0208346 A1 | 10/2004 | Baharav et al. | |
| 2009/0058598 A1* | 3/2009 | Sanchez Sanchez et al. | 340/5.83 |
| 2011/0032206 A1* | 2/2011 | Kitamura | 345/173 |

(Continued)

FOREIGN PATENT DOCUMENTS

| | | |
|---|---|---|
| EP | 2273351 A1 | 1/2011 |
| JP | 2003-298689 A | 10/2003 |
| JP | 2004-038870 A | 2/2004 |

*Primary Examiner* — Bhavesh Mehta
*Assistant Examiner* — David F Dunphy
(74) *Attorney, Agent, or Firm* — McDermott Will & Emery LLP

(57) ABSTRACT

A sensor structure (110) for a device includes both a fingerprint sensor (112) and one or more touch sensors (114). As a user input of the user moving his or her finger across the sensor structure is received, an appropriate auxiliary functionality operation as indicated by the pattern of movement is identified and performed. Additionally, during the same user input the fingerprint sensor senses fingerprint data identifying a fingerprint on the user's finger, and an attempt is made to authenticate the user's fingerprint. Thus, as the user provides a user input by moving his or her finger across the sensor structure, both an attempt is made to authenticate the user's fingerprint based on fingerprint data sensed during the user input and the operation requested by the user input is performed.

23 Claims, 15 Drawing Sheets

(56) References Cited

U.S. PATENT DOCUMENTS

| | | |
|---|---|---|
| 2011/0102567 A1 | 5/2011 | Erhart |
| 2011/0157029 A1* | 6/2011 | Tseng .......................... 345/173 |
| 2011/0267298 A1 | 11/2011 | Erhart et al. |
| 2012/0044156 A1* | 2/2012 | Michaelis et al. ............ 345/173 |
| 2012/0127179 A1* | 5/2012 | Aspelin ......................... 345/441 |
| 2012/0182253 A1 | 7/2012 | Brosnan |
| 2014/0009396 A1* | 1/2014 | Clausen ........................ 345/158 |
| 2014/0270413 A1 | 9/2014 | Slaby et al. |

* cited by examiner

AUXILIARY FUNCTIONALITY CONTROL AND FINGERPRINT AUTHENTICATION BASED ON A SAME USER INPUT

CROSS-REFERENCE TO RELATED APPLICATIONS

This application is related to co-owned U.S. patent application Ser. No. 13/832,032, entitled AUXILIARY DEVICE FUNCTIONALITY AUGMENTED WITH FINGERPRINT SENSOR and filed concurrently herewith.

BACKGROUND

One way in which access to systems or devices can be controlled is through the use of fingerprint authentication, in which a user's fingerprint is captured by a fingerprint sensor and authenticated. However, current authentication systems are not without their problems. One such problem is that authentication systems sometimes assume that a user of the phone does not change for an amount of time after the user is authenticated. This can result in situations where the user of the phone changes, but this change is not discovered by the authentication system.

BRIEF DESCRIPTION OF THE DRAWINGS

Embodiments of auxiliary functionality control and fingerprint authentication based on a same user input are described with reference to the following drawings. The same numbers are used throughout the drawings to reference like features and components.

DETAILED DESCRIPTION

Auxiliary functionality control and fingerprint authentication based on a same user input is discussed herein. A sensor structure for a device includes both a fingerprint sensor and one or more touch sensors. The sensor structure serves as an input mechanism to allow a user to provide input to control auxiliary functionality of the device by moving his or her finger across the sensor structure, and also to allow the user's fingerprint to be authenticated while moving his or her finger across the sensor structure. Various auxiliary functionality of the device can be controlled, such as the volume of audio output by the device, phone call control functionality (e.g., answering or hanging up phones), scrolling or panning through data displayed on the device, zooming in or out of a display of the device, and so forth.

As a user input of the user moving his or her finger across the sensor structure is received, an appropriate auxiliary functionality operation as indicated by the pattern of movement is identified and performed. Additionally, during the same user input the fingerprint sensor senses fingerprint data identifying a fingerprint on the user's finger, and an attempt is made to authenticate the user's fingerprint. Thus, as the user provides a user input by moving his or her finger across the sensor structure, both an attempt is made to authenticate the user's fingerprint based on fingerprint data sensed during the user input and the operation requested by the user input is performed.

Figure 1:
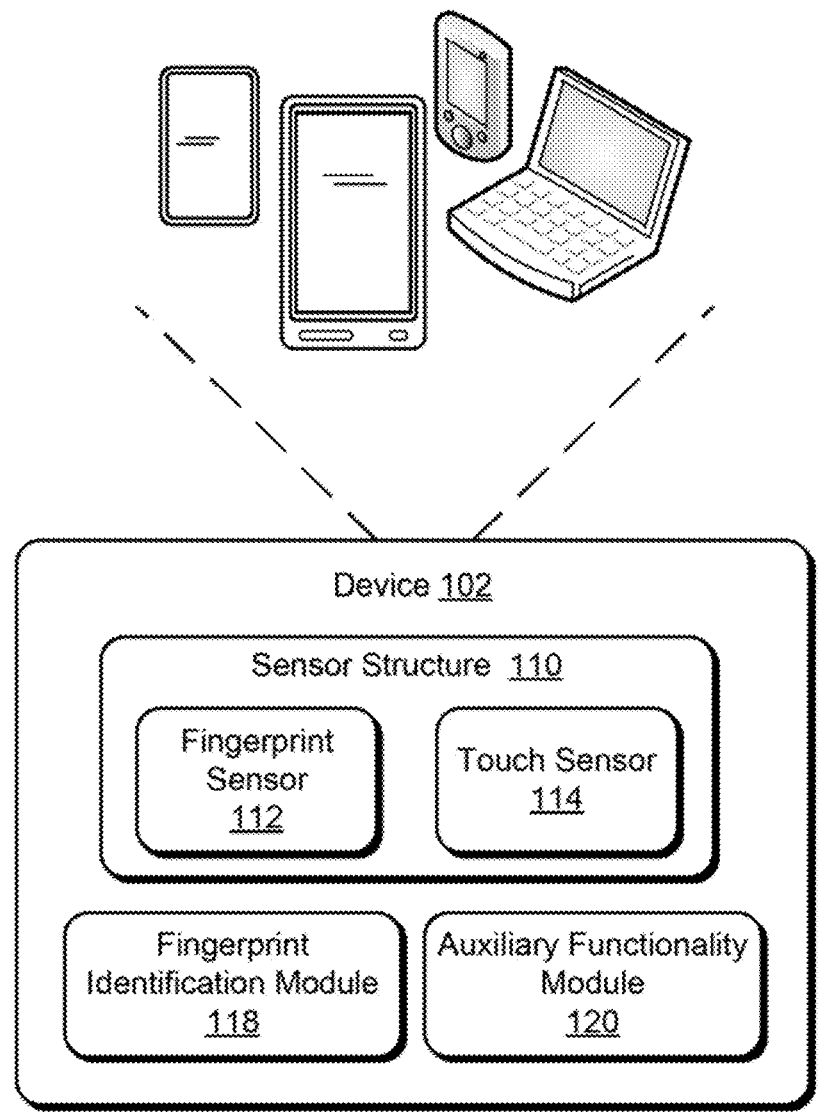
FIG. 1 illustrates an example device implementing the auxiliary functionality control and fingerprint authentication based on a same user input in accordance with one or more embodiments.

FIG. 1 illustrates an example device 102 implementing the auxiliary functionality control and fingerprint authentication based on a same user input in accordance with one or more embodiments. The device 102 can be any of a variety of different types of devices, such as a laptop computer, a cellular or other wireless phone, a tablet computer, an entertainment device, a wearable device, an audio and/or video playback device, a server computer, and so forth. The device 102 includes a sensor structure 110 having a fingerprint sensor 112, a touch sensor 114, a fingerprint identification module 118, and an auxiliary functionality module 120.

The fingerprint sensor 112 can sense fingerprint data of a user's finger touching the sensor 112. The fingerprint data identifies a fingerprint's pattern on the finger, typically identifying the location of various ridges and/or minutiae of the fingerprint. The fingerprint sensor 112 can be implemented using any of a variety of different technologies and types of sensors, such as capacitive sensors, pressure sensors, resistive sensors, optical sensors, thermal sensors, acoustic sensors, ultrasonic sensors, imaging sensors, and so forth. The fingerprint sensor 112 can be implemented as a touch fingerprint sensor or as a swipe fingerprint sensor as discussed in more detail below.

The touch sensor 114 senses a user's finger touching the sensor 114, and the fingerprint sensor 112 senses a user's finger touching the sensor 112. However, the touch sensor 114 differs from the fingerprint sensor 112 in that the touch sensor 114 does not sense fingerprint data of a user's finger touching the sensor 114. The touch sensor 114 can be implemented using any of a variety of different technologies and types of sensors, such as capacitive sensors, pressure sensors, optical sensors, thermal sensors, acoustic sensors, ultrasonic sensors, imaging sensors, and so forth. The touch sensor 114 can be implemented using the same technology and type of sensor as the fingerprint sensor 112, or alternatively using a different technology or type of sensor as the fingerprint sensor 112.

It should be noted that, although the fingerprint sensor 112 and the touch sensor 114 are illustrated in FIG. 1, the device 102 can include any number of fingerprint sensors 112 and any number of touch sensors 114.

It should also be noted that although many of the discussions herein refer to the touch sensor 114 and the fingerprint sensor 112 as sensing a finger, the touch sensors 114 and the fingerprint sensor 112 can optionally sense various other objects. For example, the sensors 112 and 114 may sense a stylus, a pen, a brush, or other object touching the sensors 112 and 114. However, the fingerprint sensor 112 can only sense a fingerprint on an object that has a fingerprint (e.g., a finger). References are made herein to a finger touching the sensors 112 or 114 or moving across the sensors 112 or 114 as examples, and it should be noted that such references also refer to other objects touching or moving across the sensors 112 or 114.

Figure 2:
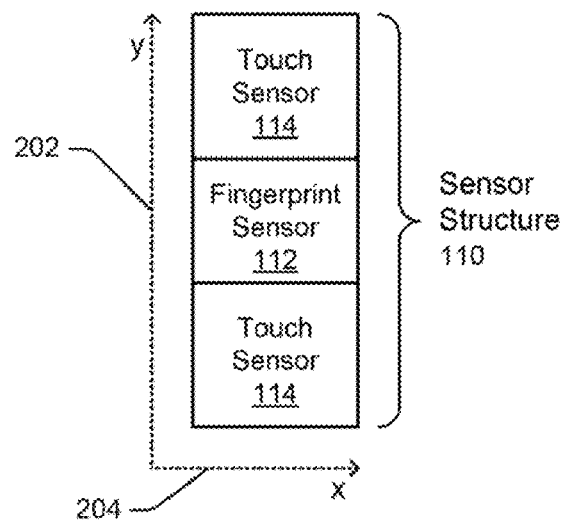
FIG. 2 illustrates a top-down view of an example sensor structure in accordance with one or more embodiments.

The fingerprint sensor 112 and one or more touch sensors 114 are situated adjacent to one another, and together form the sensor structure 110. One sensor being adjacent to another sensor refers to the two sensors being in physical contact with one another or within a threshold distance (e.g., a few millimeters) of one another. The sensors may be separate components, or may be built in the same component or substrate, such as a rigid printed circuit board (PCB) or flex PCB, or indium tin oxide (ITO) on glass or plastic. FIG. 2 illustrates a top-down view of an example sensor structure 110 in accordance with one or more embodiments. The sensor structure 110 includes the fingerprint sensor 112 adjacent to two touch sensors 114. In the illustrated example of FIG. 2, the fingerprint sensor 112 is situated between the two touch sensors 114, with one touch sensor 114 being situated above the fingerprint sensor 112 and one touch sensor 114 being situated below the fingerprint sensor 112. Various examples of sensor structures 110 are discussed herein, illustrated with rectangular sensors 112 and 114. It should be noted that these are examples, and that a fingerprint sensor 112 can have any shape (e.g., circular, rectangular, triangular, and so forth) and that a touch sensor 114 can have any shape (e.g., circular, rectangular, triangular, and so forth). A touch sensor 114 can have the same shape as the fingerprint sensor 112, or alternatively a different shape.

Returning to FIG. 1, the fingerprint identification module 118, and optionally the auxiliary functionality module 120 as well, receives inputs from the fingerprint sensor 112 indicating a finger touching the fingerprint sensor 112. Additionally, the auxiliary functionality module 120 receives inputs from the touch sensor 114 indicating a finger touching the touch sensor 114. The inputs are used by the fingerprint identification module 118 to attempt to authenticate the user's fingerprint, and used by the auxiliary functionality module 120 to identify and perform a particular operation.

The fingerprint identification module 118 analyzes fingerprint data for a fingerprint sensed by the fingerprint sensor 112 in order to authenticate the fingerprint. To authenticate the fingerprint, the fingerprint data is compared to a fingerprint template. The fingerprint template refers to fingerprint data that has been previously sensed or otherwise obtained (e.g., during an initial enrollment process) and that can be used as valid fingerprint data for the user. The fingerprint template can be stored at the device 102 or at another device accessible to the device 102, and the module 118 uses the fingerprint template to authenticate the fingerprint. It should be noted that fingerprint authentication can be performed by the device 102 for its own use and/or use by another system or device. For example, the fingerprint identification module 118 can authenticate fingerprints in order to allow a user to access the device 102 itself, to allow a user to access programs or applications running on the device 102, to allow a user to access other modules or components of the device 102, to personalize the device 102, to direct access modes of the device 102, and so forth. Alternatively, the fingerprint identification module 118 can authenticate fingerprints in order to allow a user to access another system or device coupled to the device 102, to allow a user to access another system or device accessed by the device 102 via the Internet or other network, and so forth.

The auxiliary functionality module 120 provides auxiliary functionality to the device 102. This auxiliary functionality can take a variety of different forms, and can be any functionality that can be controlled at least in part based on movement of a finger across the sensor structure. In one embodiment, the auxiliary functionality is volume control, and the module 120 increases or decreases the volume level of one or more sounds output by the device 102 in response to movement of a finger across the sensor structure 110. In another embodiment, the auxiliary functionality is call control, and the module 120 answers or ends a phone call (or other communication channel) of for the device 102 in response to movement of a finger across the sensor structure 110. In another embodiment, the auxiliary functionality is cursor control, and the module 120 moves a cursor or other user interface object or component displayed to a user of the device 102 in response to movement of a finger across the sensor structure 110. In other embodiments, the auxiliary functionality module 120 can provide various other functionality based at least in part on movement of a finger across the sensor structure 110, such as capturing photos or videos, capturing audio recordings, scrolling through lists or displays, panning through information displayed on a display of the device 102, zooming in or out of a display of the device 102, menu item switching, and so forth.

Figure 3:
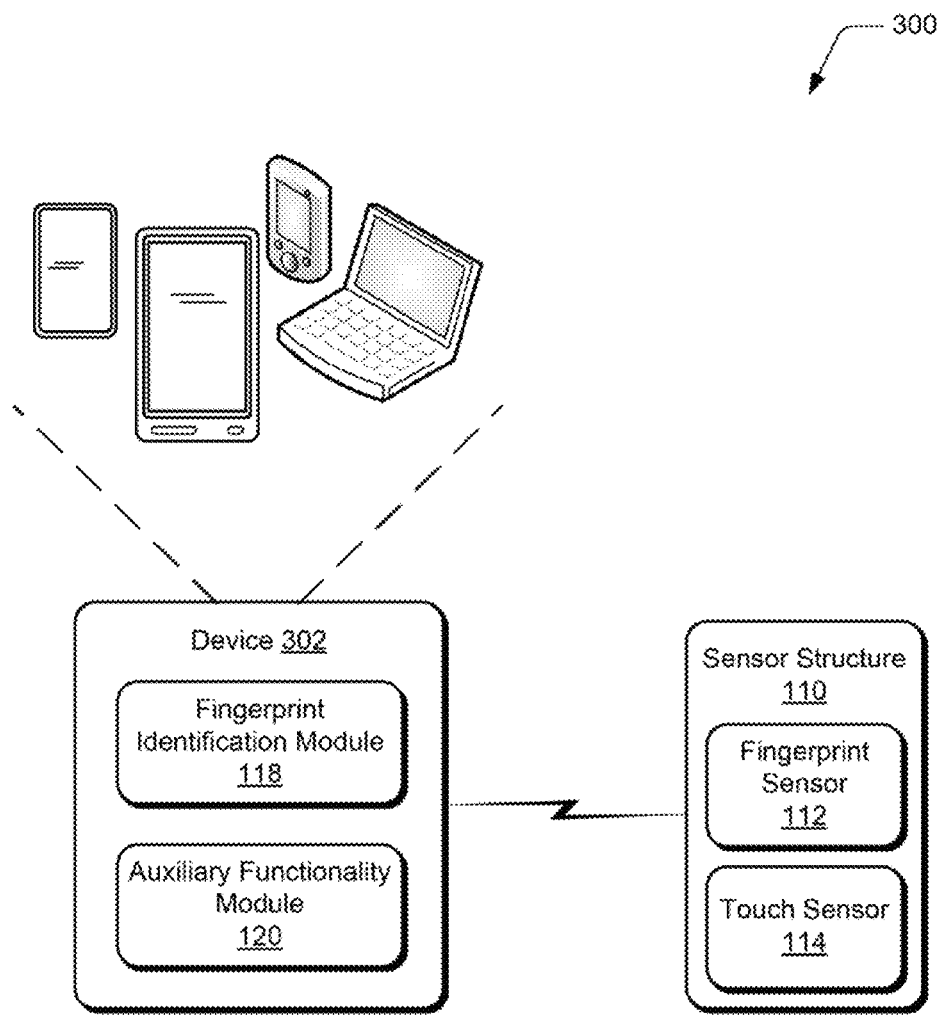
FIG. 3 illustrates an example system implementing the auxiliary functionality control and fingerprint authentication based on a same user input in accordance with one or more embodiments.

FIG. 3 illustrates an example system 300 implementing the auxiliary functionality control and fingerprint authentication based on a same user input in accordance with one or more embodiments. The system 300 includes a device 302 that can be any of a variety of different types, analogous to the discussion of device 102 of FIG. 1. The device 302 is similar to the device 102 of FIG. 1, and includes a fingerprint identification module 118 and an auxiliary functionality module 120. However, the device 302 differs from the device 102 in that the device 302 does not include the sensor structure 110.

Sensor structure 110 includes a fingerprint sensor 112 and a touch sensor 114. In system 300, the sensor structure 110 is implemented separately from the device 302, and provides data (e.g., indications of a finger touching the fingerprint sensor 112 or the touch sensor 114) to the device 302. This data can be provided via a variety of different communication channels, including wired communication channels, such as Universal Serial Bus (USB) connections, and/or wireless communication channels. Various different wireless communication channels can be used, such as wireless USB channels, Bluetooth channels, WiFi channels, Bluetooth Low Energy (BTLE) channels, near field communication (NFC) channels, TransferJet channels, radio frequency (RF) channels, optical channels, infrared (IR) channels, and so forth. In one or more embodiments, the sensor structure 110 is implemented as a wearable device, such as part of a watch or other jewelry that communicates with the device 302 implemented as another wearable device.

In the illustrated example of FIG. 3, the fingerprint identification module 118 and the auxiliary functionality module 120 are both included as part of the device 302. Alternatively, at least part of the fingerprint identification module 118 can be included in the sensor structure 110. Similarly, at least part of the auxiliary functionality module 120 can optionally be included in the sensor structure 110.

Figure 4:
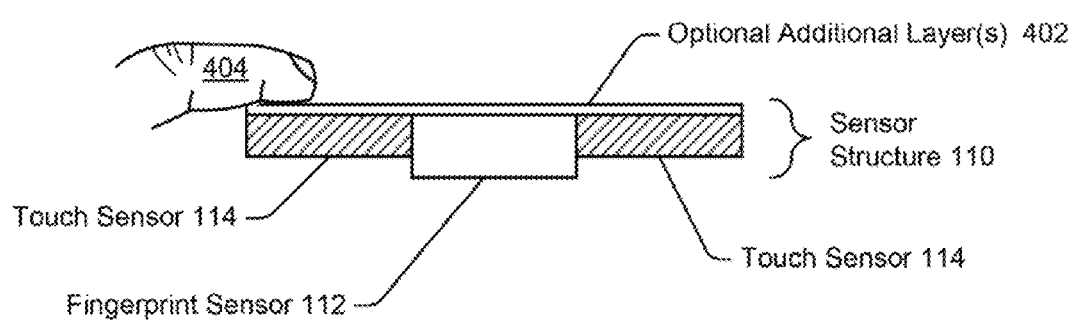
FIG. 4 illustrates a cross-section view of an example sensor structure in accordance with one or more embodiments.

FIG. 4 illustrates a cross-section view of an example sensor structure 110 in accordance with one or more embodiments. The sensor structure 110 includes the fingerprint sensor 112 adjacent to two touch sensors 114, with the touch sensors 114 being illustrated with cross-hatching. In the illustrated example of FIG. 4, the fingerprint sensor 112 is situated between the two touch sensors 114. The fingerprint sensor 112 and each touch sensor 114 can be a physically separate sensor, or alternatively can be separate areas built onto a single substrate or component (e.g., be on the same plane of the same material). The sensor structure 110 also optionally includes one or more additional layers 402 situated on top of the sensor structure 110. The one or more layers 402 can supplement the sensors 112 and 114 in various manners, such as by providing protection from scratches and abrasions, by providing protection from water or other elements, and so forth. It should be noted that the one or more layers 402 are optional and need not be included in sensor structure 110. It should also be noted that, although illustrated as being at the top of the sensor structure 110 or above the fingerprint sensor 112 and the touch sensor 114, one or more additional layers can optionally be included below the fingerprint sensor and the touch sensor 114

A finger 404 touching the sensor structure 110 is also illustrated in FIG. 4. Depending on the location where the finger touches the sensor structure, one of the touch sensors and/or the fingerprint sensor 112 can sense the finger 404 touching the sensor structure 110. In some situations, the fingerprint sensor 112 also senses fingerprint data of the finger 404. It should be noted that in situations in which the sensor structure 110 includes one or more additional layers 402, the touch sensor 114 senses a finger touching the additional layer of the sensor structure 110 above the touch sensor 114 even though the finger is not in physical contact with the touch sensor 114, and the fingerprint sensor 112 senses a finger touching the additional layer of the sensor structure 110 above the fingerprint sensor 112 even though the finger is not in physical contact with the fingerprint sensor 112.

The fingerprint sensor 112 is illustrated as having a different height or depth than the touch sensors 114. The fingerprint sensor 112 can be implemented using different technologies than the touch sensors 114, and thus may be a different size. Despite the different sizes, a top surface (the surface closest to finger 404) of the fingerprint sensor 112 is approximately flush with the top surface (the surface closest to finger 404) of the touch sensors 114, and thus the fingerprint sensor 112 and the touch sensors 114 are also referred to as being in the same plane. By having the top surfaces of sensors 112 and 114 flush with one another, the user is typically not able to feel any separation or difference between sensors 112 and 114 when moving his or her finger across the top surface of the sensor structure 110.

The sensor structure 110 in FIG. 4 is illustrated as having a top surface of the fingerprint sensor 112 being approximately flush with the top surface of the touch sensors 114. Alternatively, rather than the top surface of the fingerprint sensor 112 being approximately flush with the top surface of the touch sensors 114, the top surface of the fingerprint sensor 112 (and the area of any additional layers 402 above the fingerprint sensor 112) may be slightly recessed or slightly raised relative to the top surface of the touch sensors 114. Various amounts of recession or raising can be used, and allow the user to be able to feel a separation or difference between sensors 112 and 114 when moving his or her finger across the top surface of the sensor structure 110. Alternatively, the area of the sensor structure 110 that includes the fingerprint sensor 112 can be identified to a user in other manners, such as an additional layer 402 may have a different color or texture for areas above the fingerprint sensor 112 than for areas above the touch sensors 114, an additional layer 402 may include a slight protrusion (e.g., a bump) outward from the top surface of the sensor structure 110 in an area above the fingerprint sensor 112 (e.g., centered above the fingerprint sensor 112), and so forth.

Figure 5:
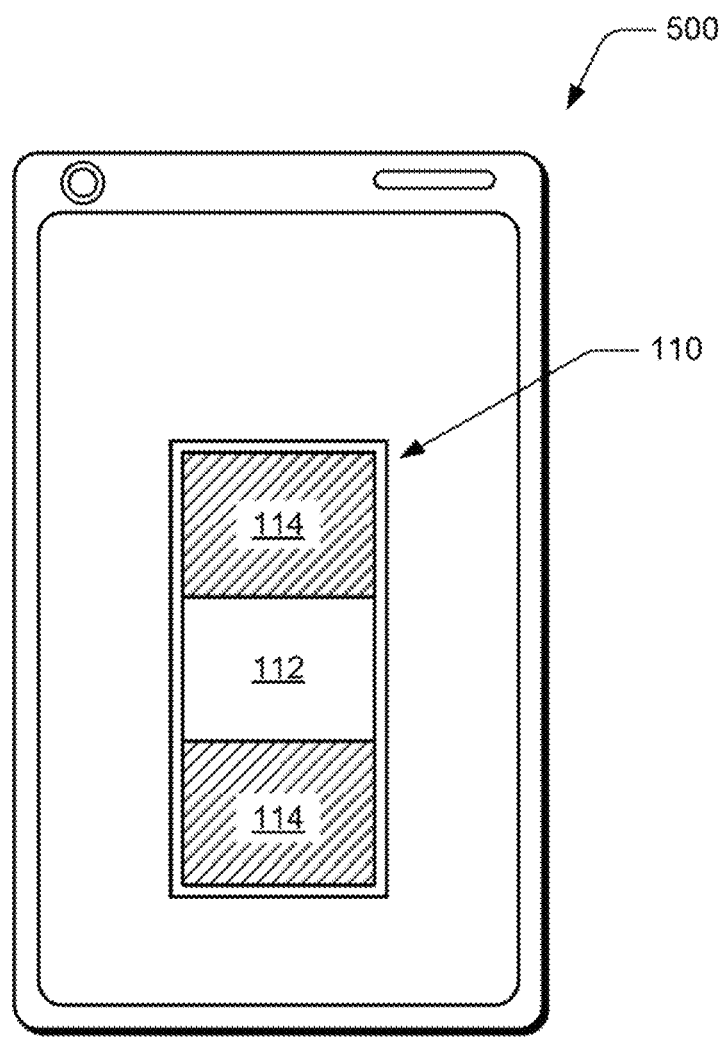
FIG. 5 illustrates an example device that includes a sensor structure in accordance with one or more embodiments.

FIG. 5 illustrates an example device 500 that includes the sensor structure 110 in accordance with one or more embodiments. The device 500 is, for example, a mobile device such as a wireless phone. The sensor structure 110 is implemented on one side of the device 500, such as on the back of the phone. The sensor structure 110 includes a fingerprint sensor situated between two touch sensors (the touch sensors being illustrated with cross-hatching), with one touch sensor being situated above the fingerprint sensor and one touch sensor being situated below the fingerprint sensor analogous to the sensor structure 110 of FIG. 2.

Figure 6:
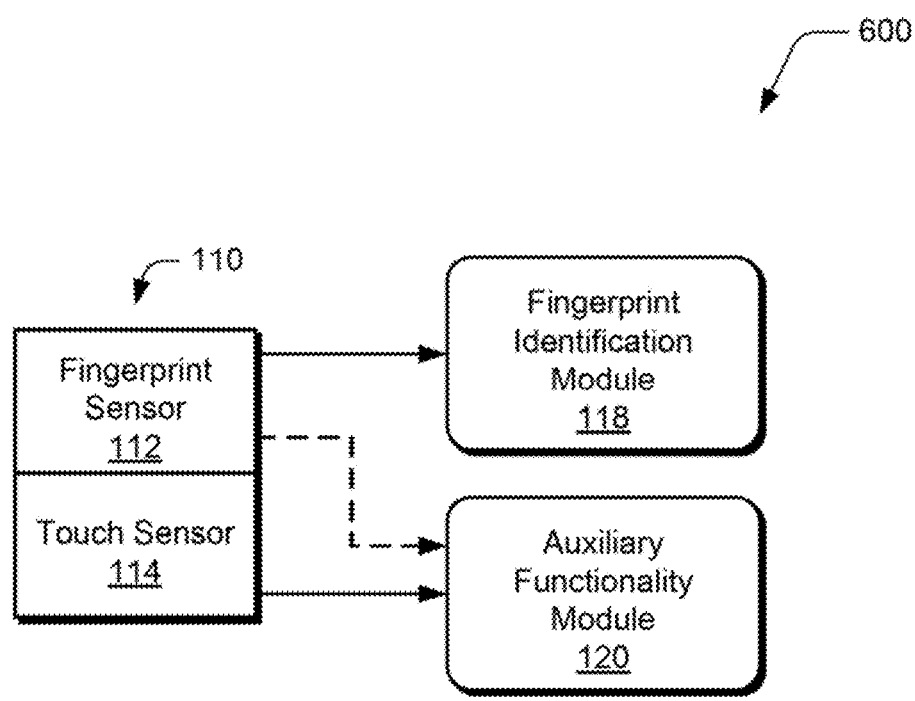
FIG. 6 illustrates an example system implementing the auxiliary functionality control and fingerprint authentication based on a same user input in accordance with one or more embodiments.

FIG. 6 illustrates an example system 600 implementing the auxiliary functionality control and fingerprint authentication based on a same user input in accordance with one or more embodiments. The system 600 can be implemented by a single device (e.g., the device 102 of FIG. 1) or multiple devices (e.g., the device 302 and a device implementing the sensor structure 110 of FIG. 3). The system 600 includes the sensor structure 110 including one or more touch sensors 114 and one or more fingerprint sensors 112.

When a finger is touching the touch sensor 114, the sensor 114 provides an indication to the auxiliary functionality module 120 of the sensor 114 being touched by the finger. This indication can take various forms. In one embodiment, the touch sensor 114 is implemented as a single sensor (also referred to as a discrete sensor), which refers to the sensor 114 being able to detect either that the sensor is being touched or not being touched. In this embodiment, the sensor 114 provides to the auxiliary functionality module 120 an indication that either the sensor is being touched or not being touched. In another embodiment, the touch sensor 114 is implemented in a grid-type arrangement that can provide at least some indication of where the sensor is being touched (as opposed to simply that the sensor is being touched or not being touched). In this embodiment, the sensor 114 provides to the auxiliary functionality module 120 an indication of where the sensor is being touched, such as one or more coordinates (e.g., using a Cartesian coordinate system) on the sensor 114 that are touched, and so forth.

The fingerprint sensor 112 is implemented in a grid-type arrangement that is capable of reproducing a fingerprint image or characteristics. In one embodiment, when a finger is touching the fingerprint sensor 112, the sensor 112 senses fingerprint data of the finger and provides an indication of the fingerprint data to the fingerprint identification module 118.

In another embodiment, the fingerprint sensor 112 includes multiple sections. When a finger is touching one or more particular sections of the fingerprint sensor 112, the sensor 112 senses fingerprint data of the finger at those sections and provides an indication of the fingerprint data to the fingerprint identification module 118. However, when a finger is touching one or more other sections of the fingerprint sensor 112, for such other sections the sensor 112 provides an indication to the auxiliary functionality module 120 of the sections of the sensor structure 110 that are sensed by the sensor 112 as being touched by the finger. The indication can be an identification of where in the section the sensor is being touched, such as one or more coordinates (e.g., using a Cartesian coordinate system) on the sensor 112 that are touched, an indication that either the section is being touched or not being touched, and so forth.

Thus, each of the sensors 112 and 114 provides an indication to the fingerprint identification module 118 and/or the auxiliary functionality module 120 when the sensor is being touched, as well as possibly an indication of where the sensor is being touched or the fingerprint data sensed. As long as the sensor is being touched, the sensor provides these indications at regular or irregular intervals to the module 118 and/or the module 120. When a sensor is no longer being touched, the sensor ceases providing these indications to the module 118 and/or the module 120.

A user input from a user of the system 600 is received in the form of the user's finger moving across the surface of the sensor structure 110. As the user's finger moves across the sensor structure 110, indications of which of the sensors 112 and/or 114 are being touched, and optionally an indication of where the sensors 112 and/or 114 are being touched, are input to the auxiliary functionality module 120. The module 120 determines a pattern of movement of the user's finger, such as a direction of the movement, a shape of the movement, a speed or velocity of the movement, and so forth. The module 120 also determines an operation associated with the determined pattern of movement of the user's finger, and performs the associated operation in response to the user input.

The pattern of movement of the user's finger can be readily determined by the module 120 based on the indications of which of, and optionally the indications of where, the sensors 112 and/or 114 are being touched and the order of the touching (e.g., as identified by the order in which the indications of touches are received from the sensor structure 110 or other timing information associated with the indications of the touches). Alternatively, rather than the module 120 determining the pattern of movement of the user's finger, the pattern can be determined by another module or control system and provided to the module 120.

Additionally, indications of fingerprint data sensed by the fingerprint sensor 112 as the user's finger moves across the fingerprint sensor 112 are provided to the fingerprint identification module 118. The fingerprint data identifies a pattern of a user's fingerprint that was sensed or detected by the fingerprint sensor 112. The fingerprint identification module 118 uses the sensed fingerprint data to attempt to authenticate the user's fingerprint as discussed in more detail below.

The sensor structure 110 can be implemented using different types of fingerprint sensors, including touch fingerprint sensors and swipe fingerprint sensors. A touch fingerprint sensor refers to a fingerprint sensor that can sense main fingerprint characteristics used to authenticate the user's fingerprint at approximately the same time. Thus, the touch fingerprint sensor does not rely on, but allows, movement of the user's finger while sensing the fingerprint data. A swipe fingerprint sensor, on the other hand, senses the fingerprint data used to authenticate the user's fingerprint over time as a user swipes his or her finger across the fingerprint sensor. The fingerprint data sensed at different times by the swipe fingerprint sensor is combined (also referred to as stitched together) to generate main fingerprint characteristics. This combining can be performed by various components, such as the fingerprint sensor 112 or the fingerprint identification module 118, and can be performed using any of a variety of public and/or proprietary techniques. Thus, the swipe fingerprint sensor can have a surface size smaller than the fingerprint of the user because substantially all of the fingerprint data for the multiple fingers need not be sensed at approximately the same time.

Figure 7:
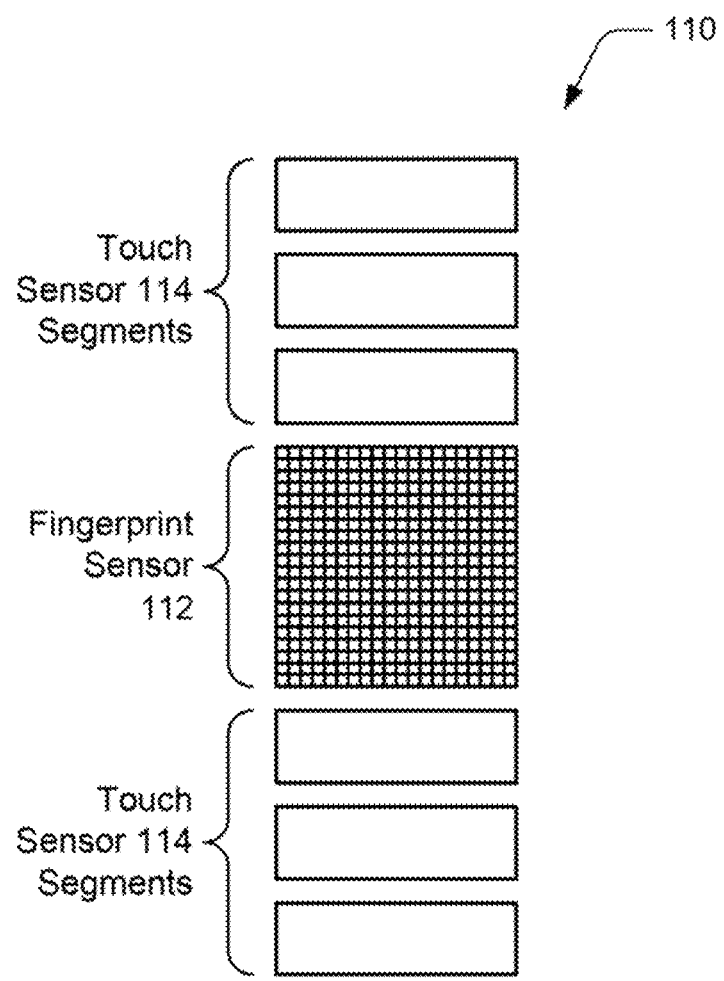
FIGS. 7, 8, and 9 illustrate top-down views of an example sensor structure including touch fingerprint sensors in accordance with one or more embodiments.
Figure 8:
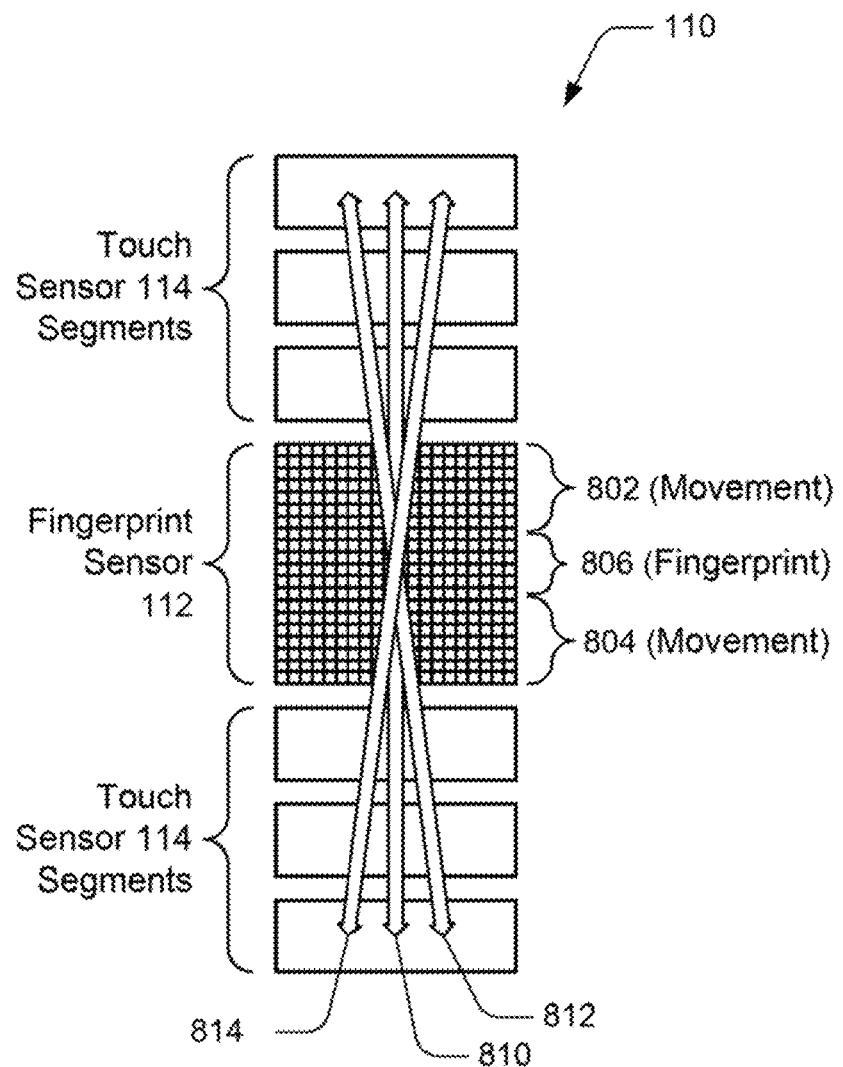
Figure 9:
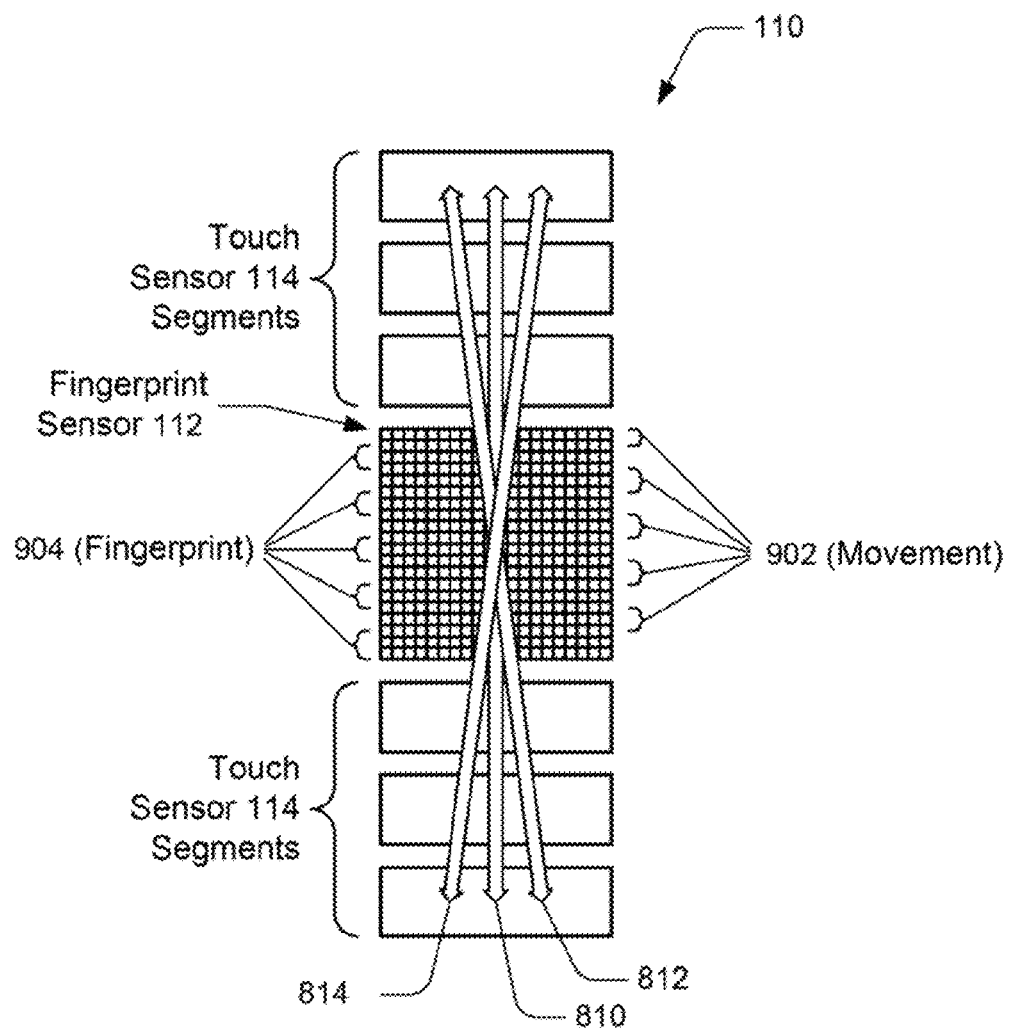

FIGS. 7, 8, and 9 illustrate top-down views of an example sensor structure 110 including touch fingerprint sensors in accordance with one or more embodiments. In the illustrated example of FIG. 7, the fingerprint sensor 112 is a touch fingerprint sensor implemented in a grid-type arrangement. The touch sensors 114 each include multiple (3 are illustrated) segments. These multiple segments can be implemented in different manners, such as each of the segments being a discrete sensor, or each sensor 114 being implemented in a grid-type arrangement.

Different sections of the fingerprint sensor 112 are assigned different functions. Some sections of the fingerprint sensor 112 are assigned the function of fingerprint data sensing, and these sections sense fingerprint data as the user's finger is moved across the fingerprint sensor 112. This sensed fingerprint data is then provided to a fingerprint identification module to attempt to authenticate the fingerprint. Sections of the fingerprint sensor 112 assigned the function of fingerprint data sensing can also sense fingerprint data without the user's finger moving across the sensor 112 (e.g., when the user's finger touches the fingerprint sensor 112 and remains stationary).

Other sections of the fingerprint sensor 112 are assigned the function of movement sensing, and these sections sense the movement of the user's finger across the fingerprint sensor 112. Indications of the sections that are sensed as touched by the user's finger as it is moved across the fingerprint sensor 112 are provided to an auxiliary functionality module to perform the appropriate operation based on the user input.

Each of the different sections of the fingerprint sensor 112 can be assigned the function of fingerprint data sensing or movement sensing in different manners. In one embodiment, the function of each section of the sensor 112 is predetermined (e.g., by a designer of the sensor structure 110 or system 600). In another embodiment, a control module or system assigns the function of each section of the sensor dynamically, allowing the assignments of functions to sections to change over time. The control module or system routes the sensed fingerprint data from sections assigned fingerprint data sensing to the fingerprint identification module, and routes indications of the sections that are sensed by the sensor 112 as being touched by the finger from sections assigned movement sensing to the auxiliary functionality module.

The assignments of functions to sections can change for various reasons, and can be based on a current state of the device implementing system 600, on contextual circumstances of receipt of the user input (e.g., such as applications to be accessed by the user input), or various other bases. For example, the assignments of function to sections can change, such as increasing the number of sections sensing fingerprint data in response to fingerprint authentication failing at at least a threshold rate, increasing the number of sections sensing movement in response to finer sensing granularity being desired by the auxiliary functionality module 120, decreasing the number of sections sensing movement in response to coarser sensing granularity being desired by the auxiliary functionality module 120, increasing or decreasing the number of sections sensing movement based on a number of sections an auxiliary functionality module 120 desires to be assigned to sensing movement, and so forth.

Various different sections of the fingerprint sensor 112 can be assigned the function of movement sensing. FIG. 8 illustrates the sensor structure 110 of FIG. 7 with the fingerprint sensor 112 including two sections 802 and 804 being assigned the function of movement sensing and one section 806 being assigned the function of fingerprint data sensing. In the illustrated example of FIG. 8, approximately the top third of the fingerprint sensor 112 and approximately the bottom third of the fingerprint sensor 112 is assigned the function of movement sensing, and approximately the middle third of the fingerprint sensor 112 is assigned the function of fingerprint data sensing.

The movement of the user's finger across the sensor structure 110 is illustrated using arrows 810, 812, and 814. For example, a particular operation of the auxiliary functionality module may be requested by a user moving his or her finger in a pattern that is vertical across the sensor structure 110, illustrated as arrow 810. The auxiliary functionality module can optionally allow some variance in this pattern of movement, so that if the user moves his or her finger in a pattern approximately vertically across the sensor structure 110, illustrated as arrow 812 or 814, the auxiliary functionality module determines that the user input is requesting that particular operation associated with the vertical movement pattern across the sensor structure 110. Further, while straight lines are shown, the movement can be wavy, zig-zag, round, or any other pattern, as far as the movement is following substantially an up-down direction. Additionally, while the arrows are shown through the center of the sensor structure 110, the motion may be anywhere across the sensor width.

Additionally, as can be seen in FIG. 8, as the user provides a user input by moving his or her finger across the sensor structure 110 in a pattern of an arrow 810, 812, or 814, both the touch sensors 114 and the fingerprint sensor 112 are touched as part of the same user input. Additionally, both the sections of the fingerprint sensor 112 assigned the function of movement sensing and the sections of the fingerprint sensor 112 assigned the function of fingerprint data sensing are touched as part of the same user input.

It should be noted that although the arrows 810, 812, and 814 indicate that both touch sensors 114 are touched, both touch sensors 114 need not be touched. For example, a user input can begin or end in fingerprint sensor 112.

FIG. 9 illustrates the sensor structure 110 of FIG. 7 with the fingerprint sensor 112 including multiple sections 902 being assigned the function of movement sensing and multiple sections 904 being assigned the function of fingerprint data sensing. The sensor structure 110 of FIG. 9 is analogous to the sensor structure 110 of FIG. 8, except for the number and size of the sections assigned the function of movement sensing and the number and size of the sections assigned the function of fingerprint data sensing. As illustrated, the sections 902 assigned the function of movement sensing are more numerous but each smaller in size than the sections 802 assigned the function of movement sensing in the sensor structure 110 of FIG. 8. Similarly, the sections 904 assigned the function of fingerprint data sensing are more numerous but each smaller in size than the sections 806 assigned the function of fingerprint data sensing in the sensor structure 110 of FIG. 8.

Thus, as can be seen in FIGS. 7-9, different sections of the touch fingerprint sensor 112 provide different functionality. Some sections sense fingerprint data as the user moves his or her finger over the fingerprint sensor 112, and other sections sense the movement of the user's finger over the fingerprint sensor 112. Which sections are assigned which functions, the size of the sections, and the number of the sections can vary.

It should be noted that although in the examples of FIGS. 8 and 9, the sections are approximately rectangular in shape and span the width of the fingerprint sensor 112, the sections can be of any size and any shape. For example, the sections can be circular, triangular, or any other shape. By way of another example, the sections can span the height of the fingerprint sensor 112, or span neither the width nor height of the sensor 112.

It should also be noted that because some sections of the fingerprint sensor 112 are not used to sense fingerprint data, the fingerprint data obtained from the one or more sections of the fingerprint sensor 112 that do sense fingerprint data may not sense fingerprint data for the entire fingerprint at one time. Additionally, because the user's finger is moving across the sensor structure 110, there is typically not a duration of time where the user's finger is stationary for the fingerprint sensor 112 to sense the fingerprint data. Accordingly, the sensed fingerprint data can be handled in different manners.

In one embodiment, the one or more sections of the touch fingerprint sensor 112 that sense fingerprint data operate as a swipe fingerprint sensor. Thus, in this embodiment the fingerprint data sensed by the one or more sections of the fingerprint sensor 112 that sense fingerprint data as the user's finger moves over those one or more sections is combined to generate main fingerprint characteristics for the finger.

In another embodiment, the fingerprint identification module 118 relies on fingerprint data for only a portion of the fingerprint (the portion captured by the one or more sections of the touch fingerprint sensor 112 that sense fingerprint data at one time). The fingerprint template used for authentication can similarly include only that portion of the fingerprint, or only that portion of the fingerprint template may be used for authentication. Additionally, because the user's finger is moving across the sensor structure 110, in this embodiment a determination can be made as to when to sense the fingerprint data. The determination can be made, for example, to sense the fingerprint data at a time when all of the sections of the sensor 112 that sense fingerprint data sense the finger touching the sensor 112. Alternatively, the fingerprint data may be sensed at multiple times as the user moves his or her finger across the sensor 112, resulting in multiple sets of fingerprint data being sensed, and one of the sets of fingerprint data may be selected as the sensed fingerprint data to compare to the fingerprint template for authentication. The selected set of fingerprint data can be, for example, the set of data indicating the largest number (or any set including at least a threshold number) of ridges and/or minutiae.

Figure 10:
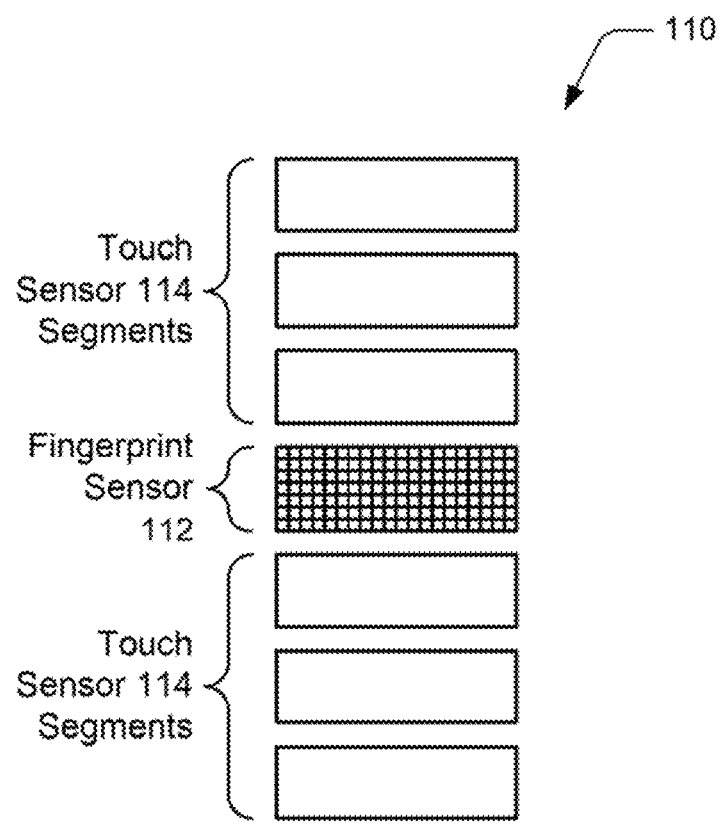
FIGS. 10 and 11 illustrate top-down views of an example sensor structure including swipe fingerprint sensors in accordance with one or more embodiments.
Figure 11:
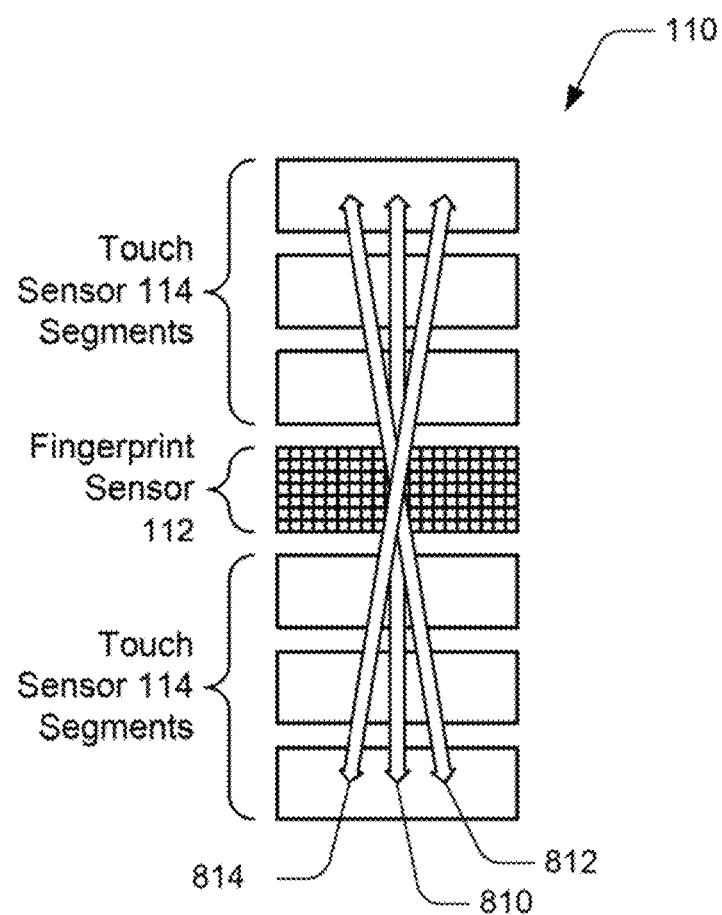

FIGS. 10 and 11 illustrate top-down views of an example sensor structure 110 including swipe fingerprint sensors in accordance with one or more embodiments. In the illustrated example of FIG. 10, the fingerprint sensor 112 is a swipe fingerprint sensor implemented in a grid-type arrangement. The touch sensors 114 each include multiple (3 are illustrated) segments. These multiple segments can be implemented in different manners, such as each of the segments being a discrete sensor, or each sensor 114 being implemented in a grid-type arrangement.

In one embodiment, given the similar size of the swipe fingerprint sensor relative to a touch sensor 114 segment, different sections of the swipe fingerprint sensor 112 are not assigned different functions. Rather, as the user moves his or her finger across the sensor structure 110, movement of the user's finger is detected based on touch as sensed by the touch sensors 114, and the fingerprint data is sensed by the fingerprint sensor 112.

In another embodiment, different sections of the swipe fingerprint sensor 112 are assigned different functions. Some sections are assigned the function of fingerprint data sensing and other sections are assigned the function of movement sensing. Which sections are assigned which functions, the size of the sections, and the number of the sections can vary analogous to the discussion above regarding the fingerprint sensor 112 of FIGS. 8 and 9.

In the illustrated example of FIG. 11, the fingerprint sensor 112 is a swipe fingerprint sensor and the touch sensors 114 each include multiple segments. The sensor structure 110 of FIG. 11 is the sensor structure 110 of FIG. 10, but with the movement of the user's finger across the sensor structure 110 illustrated using arrows 810, 812, and 814. Analogous to the discussion above regarding FIG. 8, user input in the pattern of the arrows 810, 812, or 814 can be input by a user to request a particular operation of the auxiliary functionality module be performed. Also analogous to the discussion above regarding FIG. 8, it should be noted that although the arrows 810, 812, and 814 indicate that both touch sensors 114 are touched, both touch sensors 114 need not be touched. For example, a user input can begin or end in fingerprint sensor 112.

Figure 12:
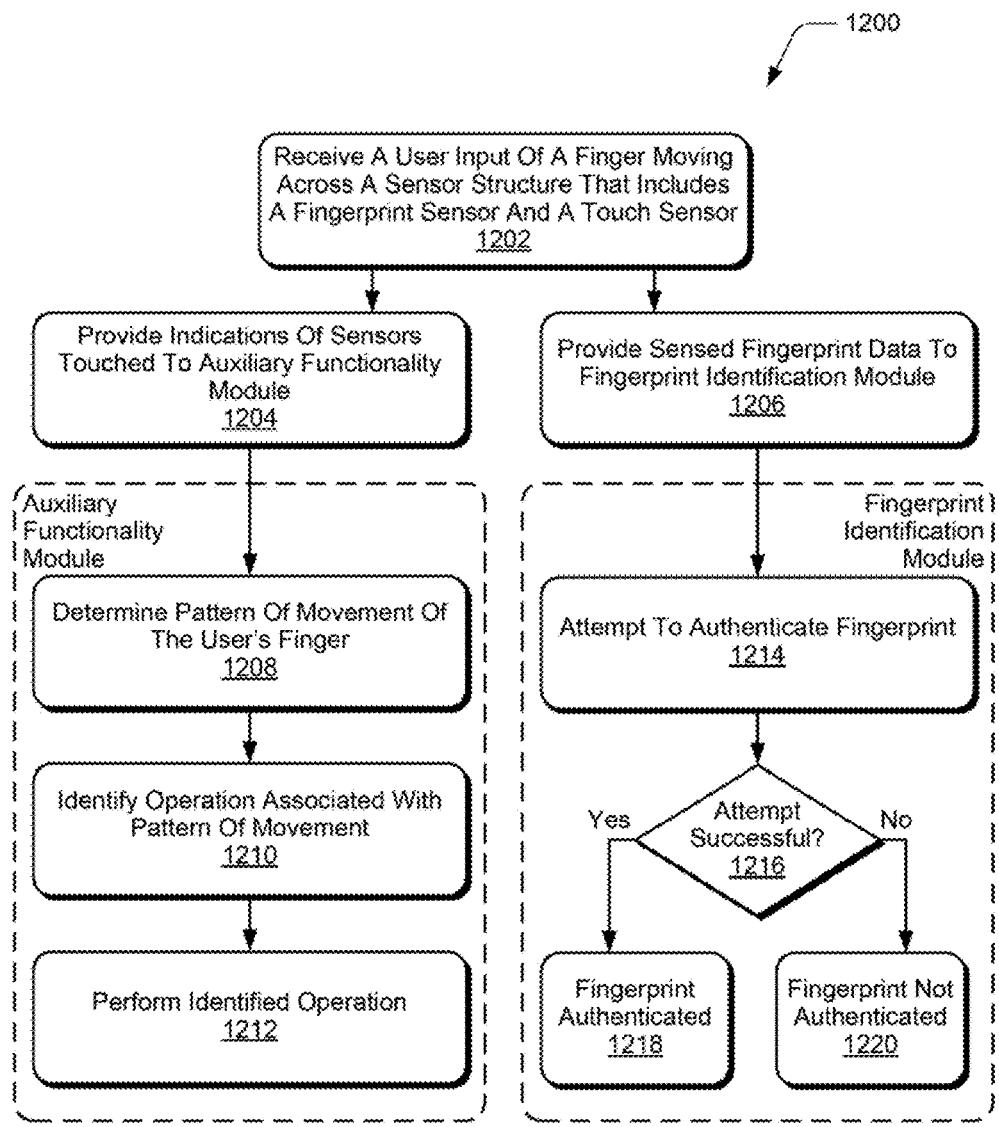
FIG. 12 illustrates an example process implementing the auxiliary functionality control and fingerprint authentication based on a same user input in accordance with one or more embodiments.
Figure 13:
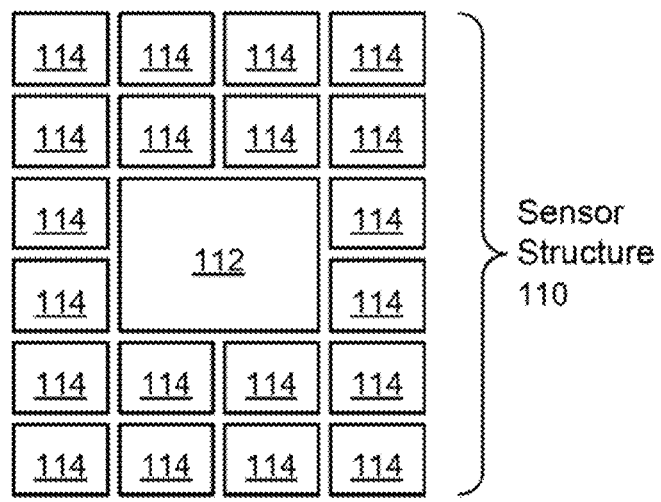
FIGS. 13, 14, 15, 16, and 17 each illustrate a different example sensor structure that includes the fingerprint sensor surrounded by touch sensors in accordance with one or more embodiments.
Figure 14:
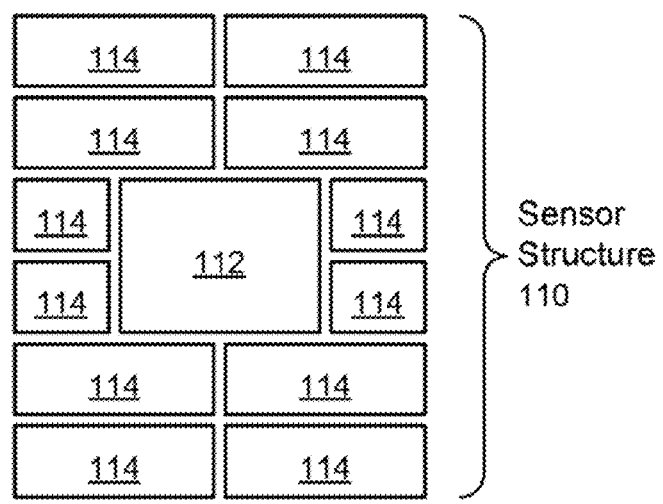
Figure 15:
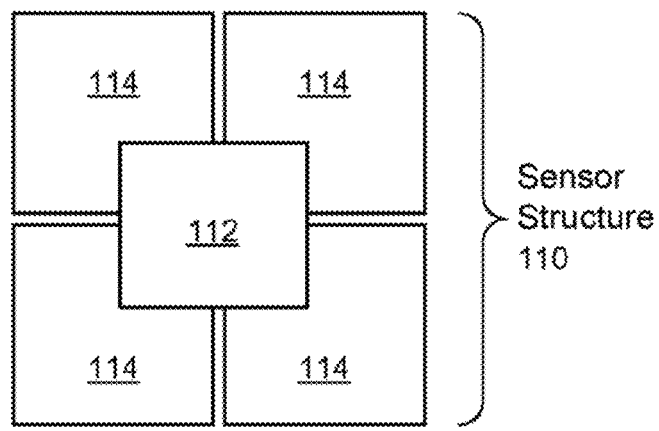
Figure 16:
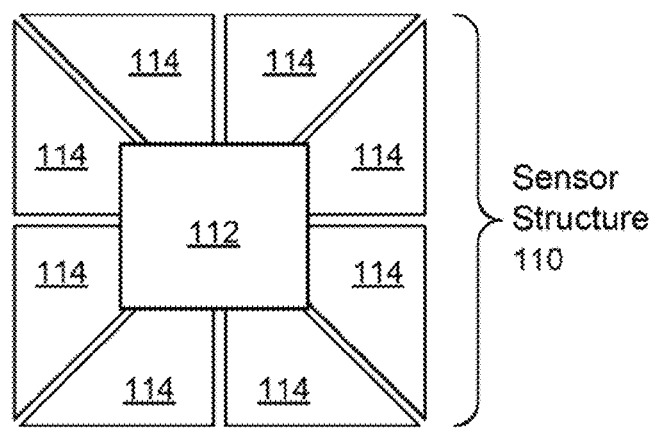
Figure 17:
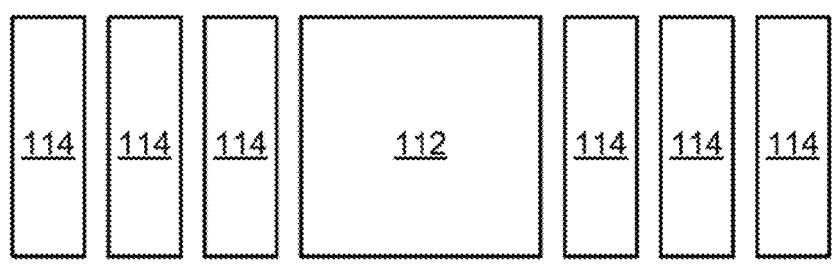

FIG. 12 illustrates an example process 1200 implementing the auxiliary functionality control and fingerprint authentication based on a same user input in accordance with one or more embodiments. Process 1200 is implemented by one or more devices or structures, such as by the device 102 of FIG. 1, by the device 302 and the sensor structure 110 of FIG. 3, and so forth. Process 1200 can be implemented in software, firmware, hardware, or combinations thereof. Process 1200 is shown as a set of acts and is not limited to the order shown for performing the operations of the various acts. Process 1200 is an example of implementing the auxiliary functionality control and fingerprint authentication based on a same user input discussed herein; additional discussions of implementing the auxiliary functionality control and fingerprint authentication based on a same user input are included herein with reference to different FIGs.

In process 1200, a user input is received in the form of a finger moving across a sensor structure that includes both a fingerprint sensor and a touch sensor (act 1202). The finger is moved across both the fingerprint sensor and the touch sensor, as discussed above.

Indications of sensors of the sensor structure being touched, and optionally indications of where the sensors are touched, are provided to the auxiliary functionality module (act 1204) as the user's finger is moved across the sensor structure. Additionally, sensed fingerprint data is provided to the fingerprint identification module (act 1206) as the user's finger is moved across the sensor structure.

Process 1200 proceeds with different acts being performed by the auxiliary functionality module and the fingerprint identification module based on the same user movement of the user's finger across the sensor structure.

The auxiliary functionality module determines a pattern of movement of the user's finger (act 1208). Various different patterns of movement can be input, and the pattern of movement of the user's finger can be readily determined by the module 120 based on which, and optionally where, the sensors 112 and/or 114 are touched and the order in which those touches occur. These patterns can include the user's finger moving across the sensor structure 110 in a line, circle, or any other shape or path.

An operation of the auxiliary functionality associated with the pattern of movement is identified (act 1210). The operations associated with particular patterns can vary by implementation, and can be enabled by sensor design and capability. The patterns can also optionally be user-configurable, allowing a user to choose from one of a set of multiple patterns or allowing the user to customize the pattern to be any pattern he or she desires.

The identified operation is performed (act 1212). Thus, the auxiliary functionality is controlled by the pattern of movement of the user's finger across the sensor structure. Various different operations can be performed based on the particular auxiliary functionality module. It should be noted that although some of the discussions herein refer to an operation associated with a pattern of movement being identified and performed, alternatively multiple operations associated with a pattern of movement can be identified and performed (e.g., concurrently, sequentially, etc.).

It should be noted that optionally the pattern of movement can be determined and the identified operation performed while the user input is being received. For example, if the auxiliary functionality is cursor control and the module moves a cursor or pointer on a display in the same pattern as the movement of the user's finger, then the pattern of movement is identified and the operation (cursor or pointer movement) is performed as the user input is being received. Alternatively, the pattern of movement may be determined and the identified operation performed after the user input has ended.

Generally, the auxiliary functionality refers to any functionality that can be controlled by user inputs to the sensor structure 110. Although specific examples of auxiliary functionality are discussed herein, it should be noted that the techniques discussed herein are not limited to these specific examples.

In one embodiment, the auxiliary functionality is volume control for a device (e.g., the device implementing the auxiliary functionality module 120). The auxiliary functionality module 120 increases or decreases volume based on the user input to the sensor structure 110. For example, in response to movement of the user's finger across the sensor structure 110 in one direction the module 120 increases the volume of audio output by the device, and in response to movement of the user's finger across the sensor structure 110 in another direction the module 120 decreases the volume of audio output by the device.

In another embodiment, the auxiliary functionality is game control for a device (e.g., the device implementing the auxiliary functionality module 120). The auxiliary functionality module 120 performs various operations in a game based on the user input to the sensor structure 110. The particular operation performed can vary based on the game implementation. For example, in response to movement of the user's finger across the sensor structure 110 in a particular direction the module 120 may move a character or object in the game in that particular direction.

In another embodiment, the auxiliary functionality is cursor control for a device (e.g., the device implementing the auxiliary functionality module 120). The auxiliary functionality module 120 moves a cursor or pointer on a display of the device based on the user input to the sensor structure 110. For example, in response to movement of the user's finger across the sensor structure 110 in a particular direction the module 120 moves a cursor or pointer on the display of the device in the same direction as the movement of the user's finger.

In another embodiment, the auxiliary functionality is zoom control for a device (e.g., the device implementing the auxiliary functionality module 120). The auxiliary functionality module 120 zooms in or out on the content displayed on a display of the device based on the user input to the sensor structure 110. For example, in response to movement of the user's finger across the sensor structure 110 in one direction the module 120 zooms in on the content being displayed, and in response to movement of the user's finger across the sensor structure 110 in another direction the module 120 zooms out on the content being displayed by the device.

In another embodiment, the auxiliary functionality is scroll control for a device (e.g., the device implementing the auxiliary functionality module 120). The auxiliary functionality module 120 scrolls through content displayed on a display of the device based on the user input to the sensor structure 110. For example, in response to movement of the user's finger across the sensor structure 110 in one direction the module 120 scrolls the content being displayed in one direction (e.g., up or to the left), and in response to movement of the user's finger across the sensor structure 110 in another direction the module 120 scrolls the content being displayed in another direction (e.g., down or to the right).

In another embodiment, the auxiliary functionality is menu control for a device (e.g., the device implementing the auxiliary functionality module 120). The auxiliary functionality module 120 switches through menus and/or items in a menu displayed on a display of the device based on the user input to the sensor structure 110. For example, in response to movement of the user's finger across the sensor structure 110 in one direction the module 120 switches to another menu (e.g., the next menu to the left of a currently displayed menu) or another menu item (e.g., the next menu item above the currently highlighted menu item), and in response to movement of the user's finger across the sensor structure 110 in another direction the module 120 switches to another menu (e.g., the next menu to the right of a currently displayed menu) or another menu item (e.g., the next menu item below the currently highlighted menu item).

In another embodiment, the auxiliary functionality is photography control for a device (e.g., the device implementing the auxiliary functionality module 120). The auxiliary functionality module 120 performs various operations related to image capture based on the user input to the sensor structure 110. The particular operation performed can vary based on implementation. For example, in response to movement of the user's finger across the sensor structure 110 in a particular direction the module 120 may take a picture (capture an image), zoom in or zoom out on the scene being captured, increase or decrease exposure time, and so forth.

In another embodiment, the auxiliary functionality is phone call control for a device (e.g., the device implementing the auxiliary functionality module 120). The auxiliary functionality module 120 performs various operations related to controlling phone calls based on the user input to the sensor structure 110. The particular operation performed can vary based on implementation. For example, in response to movement of the user's finger across the sensor structure 110 in a particular direction the module 120 may answer a ringing telephone, hang up on a current call, and so forth.

Although various embodiments providing different auxiliary functionality are discussed, it should be noted that multiple ones of these embodiments can be combined. System 600 of FIG. 6 can optionally include multiple auxiliary functionality modules 120, and a particular one of those multiple functionality modules 120 can be enabled based on a current state of the device implementing system 600, and also on contextual circumstances of receipt of the user input. The state of the device or contextual circumstances refers to one or more of a manner in which the device is currently being used, a current power state of the device, which programs are currently running on the device, which programs or functionality are available on the device, device motion, speed, where the device is located, time of day, and so forth. For example, if a game is currently being played then an auxiliary functionality module 120 that provides game control for the device can be enabled, if the device includes phone functionality and the device is currently ringing (indicating an incoming phone call) then an auxiliary functionality module 120 that provides phone call control for the device can be enabled.

It should also be noted that auxiliary functionality of multiple auxiliary functionality modules 120 can be implemented concurrently, and the pattern of movement of the user's finger used to determine which of the modules 120 is to perform an operation based on the user input. For example, in response to a movement of the user's finger across the sensor structure in one dimension (e.g., horizontally, or along an x axis in a Cartesian coordinate system) an auxiliary functionality module 120 can be enabled (or can be configured to respond to movement in that dimension) to provide volume control for the device implementing system 600, and in response to a movement of the user's finger across the sensor structure in a different dimension (e.g., vertically, or along a y axis in a Cartesian coordinate system) an auxiliary functionality module 120 can be enabled (or can be configured to respond to movement in that dimension) that provides menu control for the device. An example of a 2-dimensional Cartesian coordinate system is illustrated in FIG. 2, with a y axis 202 and an x axis 204.

In process 1200, based on the same user input as is used to determine the pattern of movement of the user's finger, an attempt to authenticate the fingerprint in the sensed fingerprint data is made (act 1214). The attempt to authenticate the fingerprint is made based on the fingerprint data sensed while the finger is moving across the sensor structure.

Process 1200 proceeds based on whether the attempt is successful (act 1216). If the attempt is successful, then the fingerprint (and the user) is authenticated (act 1218). However, if the attempt is unsuccessful, then the fingerprint (and the user) is not authenticated (act 1220).

Various different actions can be taken based on whether the fingerprint is authenticated or not authenticated. For example, the control system of the device may allow continued operation of the device only if at least a threshold number of the attempts are successful. If at least a threshold number of attempts are not successful, the control system may provide a warning to the user that he or she is not authorized, may require a separate user authentication process (other than the authentication performed as the user moves his or her finger across the sensor structure), and so forth.

The fingerprint data sensed in act 1206 identifies a pattern of a user's fingerprint that was sensed or detected by the fingerprint sensor 112 as discussed above. In one embodiment, this fingerprint data is an indication of the locations where minutiae and/or ridges of the fingerprint are sensed or identified by the fingerprint sensor 112. The locations can be identified in various different manners, such as using a 2-dimensional Cartesian coordinate system in which the locations where minutiae or ridges are sensed are identified using x,y coordinates. Alternatively, other coordinate systems can be used, such as Polar coordinate systems, proprietary coordinate systems, and so forth.

The fingerprint identification module 118 analyzes the sensed fingerprint data and compares it to the fingerprint template for the user. The fingerprint template can be stored in the same device as implements the fingerprint identification module 118, or alternatively can be stored in a separate device (e.g., accessible to the fingerprint identification module 118 via any of a variety of data networks). The fingerprint template for the user's finger can be stored at various times, such as during an enrollment process, which refers to a process during which the user is setting up or initializing the fingerprint identification module 118 to authenticate his or her fingerprint.

The fingerprint identification module 118 compares the sensed fingerprint to the fingerprint template, and based on this comparison the fingerprint identification module 118 determines whether the sensed fingerprint satisfies the fingerprint template. When the fingerprint satisfies the fingerprint template (e.g., the fingerprint data matches the fingerprint template), the fingerprint authentication succeeds and the fingerprint (and the user) is authenticated. When the fingerprint does not satisfy the fingerprint template (e.g., the fingerprint data does not match the fingerprint template), the fingerprint authentication fails and the fingerprint (and the user) is not authenticated. The fingerprint identification module 118 can make this comparison in different manners in accordance with various different embodiments. In one embodiment, the fingerprint identification module 118 compares the sensed fingerprint data to the fingerprint template and determines whether the sensed fingerprint data matches the fingerprint template for the user.

The fingerprint identification module 118 can determine whether the sensed fingerprint data and the fingerprint template match in various different manners. In one embodiment, the locations where minutiae or ridges are detected as indicated in the sensed fingerprint data and the fingerprint template are compared. If the number of corresponding locations in the sensed fingerprint data and the fingerprint template where minutiae or ridges are detected satisfies (e.g., is equal to and/or greater than) a threshold value, the sensed fingerprint data and the fingerprint template match; otherwise, the sensed fingerprint data and the fingerprint template do not match. Various different correlation or alignment techniques can be used to align the two fingerprint data so that corresponding features (e.g., at the same coordinates relative to an origin or other reference point) can be readily identified. Alternatively, various other public and/or proprietary pattern matching techniques can be used to determine whether the sensed fingerprint data and the fingerprint template match.

Thus, as can be seen from the discussions herein, both fingerprint authentication and auxiliary functionality control are based on the same user input. A single user input of the user moving his or her finger across the sensor structure results in the operation associated with the pattern of movement as determined by an auxiliary functionality module being performed, as well as the user's fingerprint being authenticated. Therefore, the user's fingerprint is authenticated automatically while the user is providing user input to control auxiliary functionality of the device.

Various different examples of implementing the sensor structure 110 are discussed with reference to FIGS. 13, 14, 15, 16, and 17. The examples of FIGS. 13-17 are top-down views of example sensor structures 110. It should be noted that the examples of FIGS. 13-17 are only examples, and that the sensor structure 110 can be implemented using various other configurations of fingerprint and touch sensors.

FIGS. 13, 14, 15, 16, and 17 each illustrate a different example sensor structure 110 that includes the fingerprint sensor 112 surrounded by touch sensors 114. These different example sensor structures illustrate different shapes and/or arrangements of sensors in a sensor structure 110. The touch sensors 114 of the different sensor structures 110 may be implemented as single sensors or in a grid-type arrangement as discussed above. The fingerprint sensors 112 of the different sensor structures 110 can be touch fingerprint sensors or swipe fingerprint sensors as discussed above.

Figure 18:
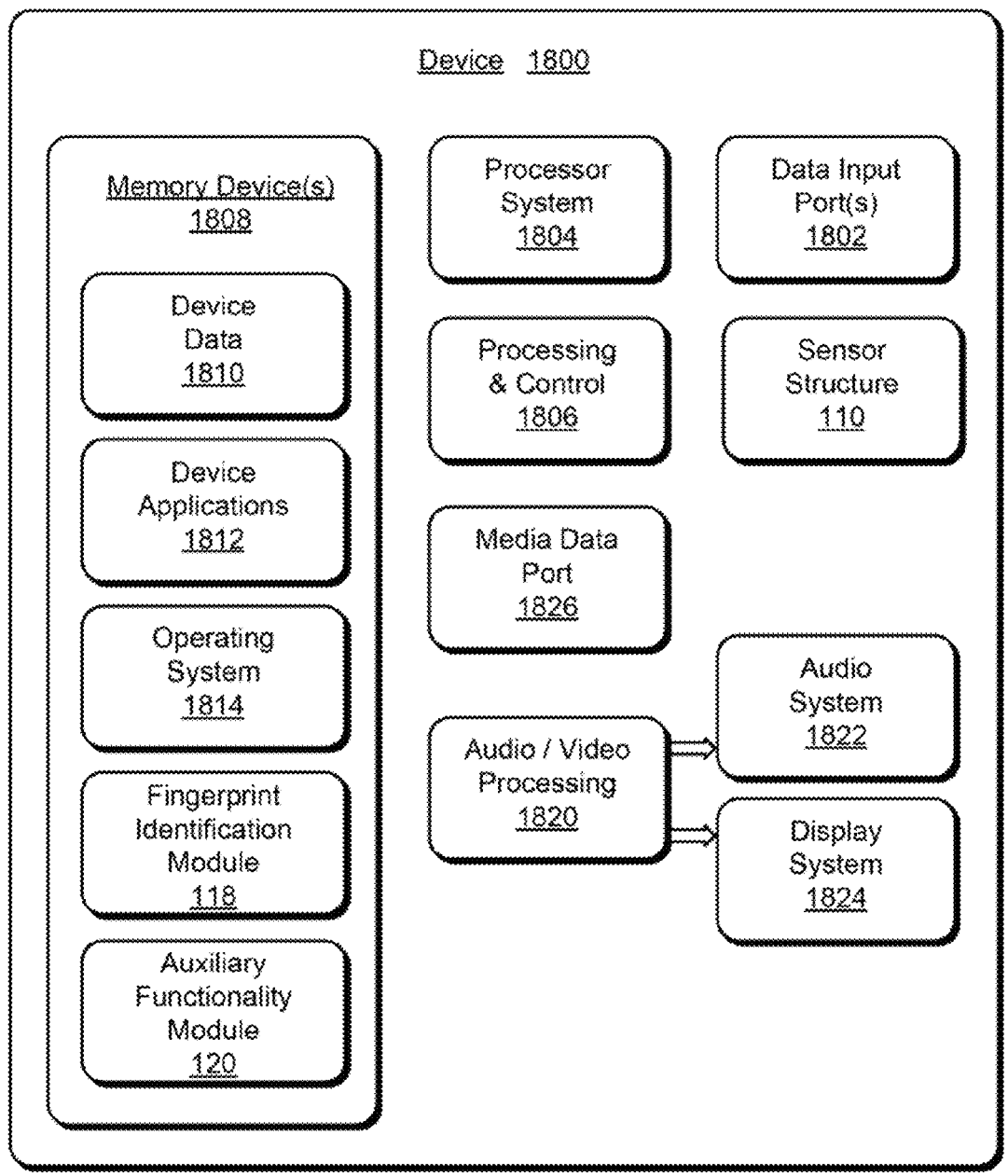
FIG. 18 illustrates various components of an example electronic device that can implement embodiments of the auxiliary functionality control and fingerprint authentication based on a same user input in accordance with one or more embodiments.

FIG. 18 illustrates various components of an example electronic device 1800 that can be implemented as a device as described with reference to any of the previous FIGS. 1-17. The device 1800 may be implemented as any one or combination of a fixed or mobile device, in any form of a consumer, computer, portable, wearable, user, communication, phone, navigation, gaming, messaging, Web browsing, paging, media playback, and/or other type of electronic device.

The electronic device 1800 can include one or more data input ports 1802 via which any type of data, media content, and/or inputs can be received, such as user-selectable inputs, messages, music, television content, recorded video content, and any other type of audio, video, and/or image data received from any content and/or data source. The data input ports 1802 may include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

The electronic device 1800 of this example includes a processor system 1804 (e.g., any of microprocessors, controllers, and the like), or a processor and memory system (e.g., implemented in an SoC), which process computer-executable instructions to control operation of the device. A processing system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the electronic device can be implemented with any one or combination of software, hardware, firmware, or fixed logic circuitry that is implemented in connection with processing and control circuits, which are generally identified at 1806. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 1800 also includes one or more memory devices 1808 that enable data storage, examples of which include random access memory (RAM), non-volatile memory (e.g., read-only memory (ROM), flash memory, EPROM, EEPROM, etc.), and a disk storage device. A memory device 1808 provides data storage mechanisms to store the device data 1810, other types of information and/or data, and various device applications 1812 (e.g., software applications). For example, an operating system 1814 can be maintained as software instructions with a memory device and executed by the processor system 1804.

In embodiments, the electronic device 1800 includes a fingerprint identification module 118 and an auxiliary functionality module 120 as described above. Although represented as a software implementation, each of the fingerprint identification module 118 and the auxiliary functionality module 120 may be implemented as any form of a control application, software application, signal-processing and control module, firmware that is installed on the device, a hardware implementation, and so on. The electronic device 1800 can also include a sensor structure 110 as described above.

The electronic device 1800 can also include an audio and/or video processing system 1820 that processes audio data and/or passes through the audio and video data to an audio system 1822 and/or to a display system 1824. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1826. In implementations, the audio system and/or the display system are external components to the electronic device. Alternatively or in addition, the display system can be an integrated component of the example electronic device, such as part of an integrated touch interface.

Although embodiments of auxiliary functionality control and fingerprint authentication based on a same user input have been described in language specific to features and/or methods, the subject of the appended claims is not necessarily limited to the specific features or methods described. Rather, the specific features and methods are disclosed as example implementations of auxiliary functionality control and fingerprint authentication based on a same user input.

The invention claimed is:

1. A method comprising:
   receiving a user input of a finger moving across a sensor structure of a mobile device, the sensor structure including a fingerprint sensor, a first touch sensor adjacent to the fingerprint sensor and a second touch sensor adjacent to the fingerprint sensor, the fingerprint sensor situated between the first touch sensor and the second touch sensor, the fingerprint sensor comprising multiple sections;
   assigning one or more of the multiple sections to one of sensing fingerprint data and sensing movement of the finger across the fingerprint sensor;
   performing auxiliary functionality of a device based on a pattern of movement of the finger across the sensor structure and sections of the fingerprint sensor assigned to sensing movement; and
   authenticating a fingerprint of the finger based on fingerprint data sensed by sections of the fingerprint sensor assigned to sensing fingerprint data during the finger moving across the sensor structure.

2. The method as recited in claim 1, further comprising determining the pattern of movement of the finger across the sensor structure based on the finger touching both the touch sensor and the fingerprint sensor while moving across the sensor structure.

3. The method as recited in claim 1, the method further comprising receiving an indication of the fingerprint data from one of the multiple sections of the fingerprint sensor, and receiving from another of the multiple sections of the fingerprint sensor an indication of the section of the fingerprint sensor touched while the finger is moving across the fingerprint sensor.

4. The method as recited in claim 1, the dynamically assigning further comprising dynamically assigning one or more of the multiple sections in response to contextual circumstances of receipt of the user input.

5. The method as recited in claim 1, the performing auxiliary functionality of the device comprising enabling one of multiple auxiliary functionality modules of the device in response to different patterns of movement, different ones of the multiple auxiliary functionality modules performing different operations for different auxiliary functionality.

6. The method as recited in claim 1, the performing auxiliary functionality of the device comprising enabling one of multiple auxiliary functionality modules of the device in response to contextual circumstances of receipt of the user input.

7. The method as recited in claim 1, wherein the auxiliary functionality of the device comprises a volume control of the device in which the user input is used as volume control input.

8. The method as recited in claim 1, wherein the auxiliary functionality of the device comprises game control, cursor control, zoom control, scroll control, menu control, photography control, or phone call control.

9. The method of claim 1, wherein assigning the one or more of the multiple sections further comprises dynamically assigning the one or more of the multiple sections based on a current state of the mobile device or a contextual circumstance of receipt of the user input.

10. A mobile device comprising:
    one or more processors;
    a machine-readable medium comprising instructions stored therein, which when executed by the one or more processors, cause the processors to perform operations comprising:
    assigning one or more of multiple sections of a fingerprint sensor to one of sensing fingerprint data and sensing movement of a finger across the fingerprint sensor;
    performing one or more auxiliary functionality operations based on a user input of the finger moving across a sensor structure and sections of the fingerprint sensor assigned to sensing movement, the sensor structure including a first touch sensor adjacent to the fingerprint sensor and a second touch sensor adjacent to the fingerprint sensor, the fingerprint sensor situated between the first sensor and the second sensor; and
    attempting to authenticate a fingerprint of the finger based on fingerprint data sensed by sections of the fingerprint sensor assigned to sensing fingerprint data during the same user input upon which performance of the one or more auxiliary functionality operations is based.

11. The device as recited in claim 10, the device including the sensor structure.

12. The device as recited in claim 10, the one of the multiple sections sensing fingerprint data operating as a swipe fingerprint sensor that senses the fingerprint data as the finger is swiped across the one section.

13. The device as recited in claim 10, the fingerprint sensor comprising a swipe fingerprint sensor that senses the fingerprint data as the finger is swiped across the fingerprint sensor.

14. The device as recited in claim 10, wherein the operations further comprises performing one or more additional auxiliary functionality operations based on the user input, the user input comprising a pattern of movement of the finger moving across the sensor structure, and performing an auxiliary functionality operation based on the pattern of movement.

15. The device as recited in claim 10, further comprising operations for volume control, game control, cursor control, zoom control, scroll control, menu control, photography control, or phone call control.

16. The device as recited in claim 10, the device comprising a wireless phone.

17. The device of claim 10, wherein assigning the one or more of the multiple sections further comprises dynamically assigning the one or more of the multiple sections based on a current state of the mobile device or a contextual circumstance of receipt of the user input.

18. A system comprising:
    a sensor structure configured to sense a finger moving across the sensor structure, the sensor structure including a plurality of touch sensors surrounding a fingerprint sensor, the fingerprint sensor comprising multiple sections;

one or more processors;

a machine-readable medium comprising instructions stored therein, which when executed by the one or more processors, cause the processors to perform operations comprising:

assigning one or more of the multiple sections to one of sensing fingerprint data and sensing movement of the finger across the fingerprint sensor;

controlling auxiliary functionality of the system based on a pattern of movement of the finger across the sensor structure and sections of the fingerprint sensor assigned to sensing movement; and attempting to authenticate a fingerprint of the finger based on fingerprint data sensed by sections of the fingerprint sensor assigned to sensing fingerprint data while the finger moves across the sensor structure.

19. The system as recited in claim 18, wherein the one or more sections of the fingerprint sensor that are assigned the function of fingerprint data sensing operate as a swipe fingerprint sensor that sense the fingerprint data as the finger is swiped across the one or more sections.

20. The system as recited in claim 18, the fingerprint sensor comprising a swipe fingerprint sensor that senses the fingerprint data as the finger is swiped across the fingerprint sensor.

21. The system as recited in claim 18, wherein the operations further comprises operations for volume control, game control, cursor control, zoom control, scroll control, menu control, photography control, or phone call control.

22. The system as recited in claim 18, wherein the operations further comprises operations to control additional auxiliary functionality of the system based on the pattern of movement of the finger across the sensor structure.

23. The system of claim 18, wherein assigning the one or more of the multiple sections further comprises dynamically assigning the one or more of the multiple sections based on a current state of the mobile device or a contextual circumstance of receipt of the pattern of movement of the finger.

* * * * *